July 8, 1947. A. C. RUGE 2,423,620
CONDITION RESPONSIVE APPARATUS FOR ROTATABLE MEMBERS
Filed Oct. 29, 1943 5 Sheets-Sheet 1
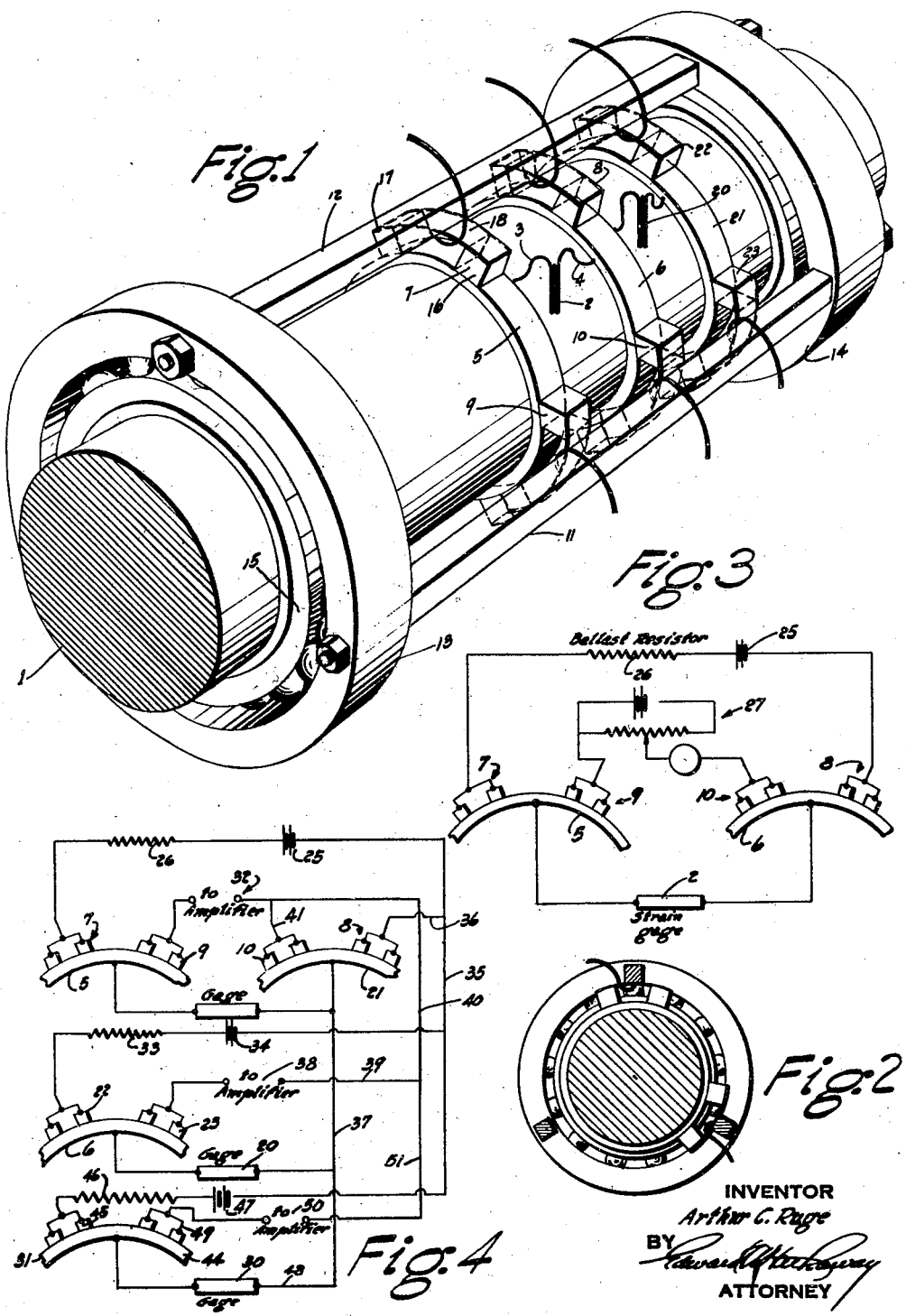
INVENTOR
Arthur C. Ruge
BY
ATTORNEY

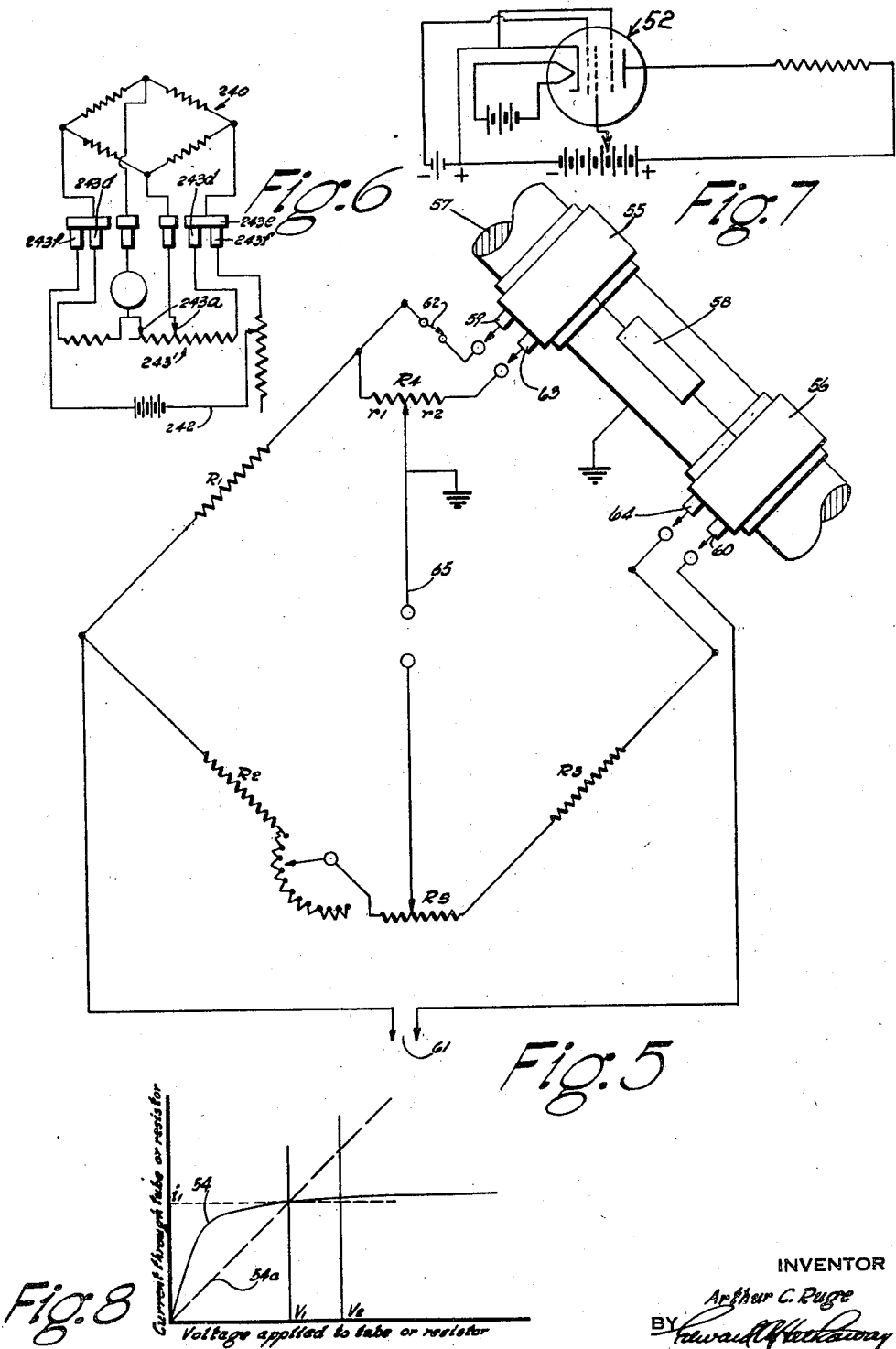

July 8, 1947.  A. C. RUGE  2,423,620
CONDITION RESPONSIVE APPARATUS FOR ROTATABLE MEMBERS
Filed Oct. 29, 1943     5 Sheets-Sheet 3

INVENTOR
Arthur C. Ruge
BY
ATTORNEY

July 8, 1947. A. C. RUGE 2,423,620
CONDITION RESPONSIVE APPARATUS FOR ROTATABLE MEMBERS
Filed Oct. 29, 1943 5 Sheets-Sheet 4

Inventor
Arthur C. Ruge
By Edward A. Hickey
Attorney

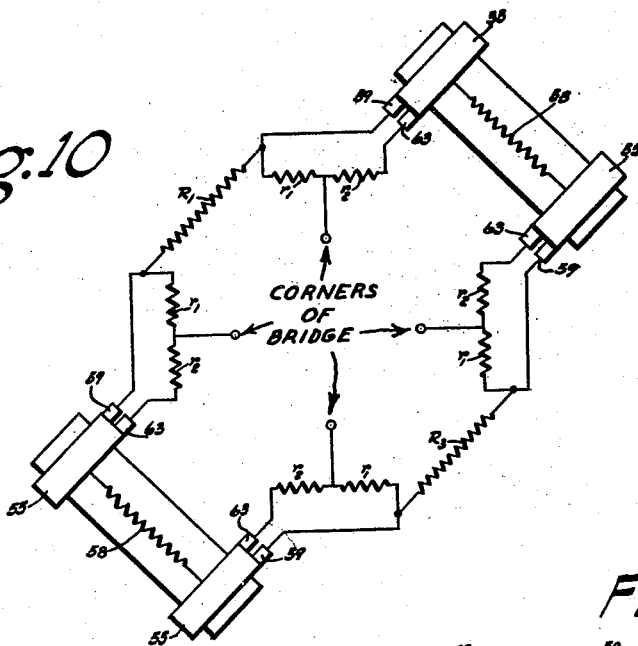
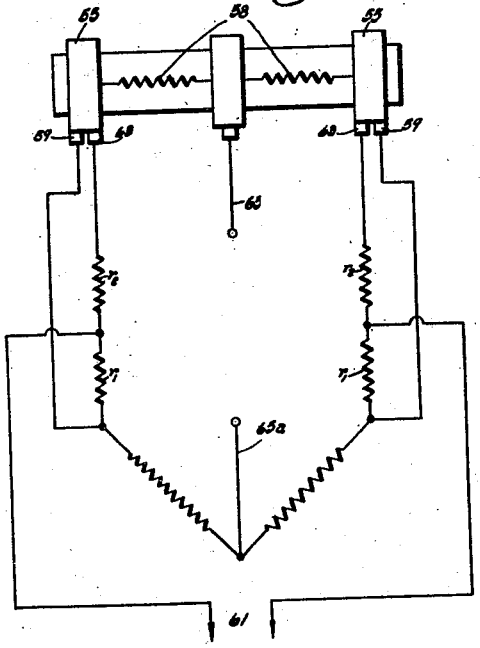
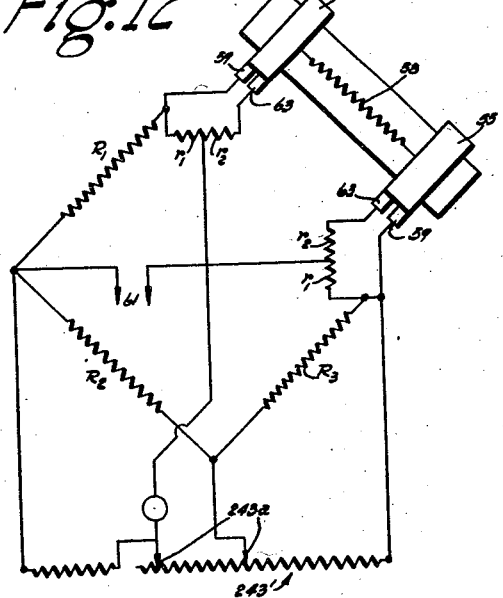

Patented July 8, 1947

2,423,620

UNITED STATES PATENT OFFICE 2,423,620

CONDITION RESPONSIVE APPARATUS FOR ROTATABLE MEMBERS

Arthur C. Ruge, Cambridge, Mass., assignor to The Baldwin Locomotive Works, a corporation of Pennsylvania Application October 29, 1943, Serial No. 508,216

11 Claims. (Cl. 73—136)

This invention relates generally to apparatus for measuring certain conditions of rotatable members which may be shafts, airplane propellers or other revolving elements, and more particularly for measuring conditions such, for example, as torque, temperature, pressure, speed, acceleration or strains arising from various causes, where the condition to be measured causes a change in the electrical impedance of a responsive element attached to and rotating with the member.

Apparatus of the type specifically disclosed herein employs, for purposes of illustration, strain sensitive electrical impedance means mounted on a rotating member so as to produce an impedance change responsive to torsional or other forms of strains in the member, the impedance change being transmitted through slip rings connected by brushes to an external indicating, measuring or controlling device. "Controlling device" refers, for example, to such an arrangement where the amount of torque acting on the rotating member is automatically or manually controlled to a predetermined value or variation, the controlling signal being transmitted through the slip rings from the responsive element. Similarly, temperature or other phenomena may be subject to control, as is common practice in industrial instrumentation save for my improved method of employing brush and slip ring circuits. One difficulty with this general type of slip ring apparatus is that the slip rings and brushes inherently have a variable contact resistance which is usually sufficiently erratic compared to the relatively small change of impedance change measured as to present an extremely serious problem in determining the amount of the impedance change, particularly if a high degree of accuracy is desired and especially when the strain sensitive means is of a relatively low impedance type. In some instances it has been heretofore proposed to overcome this variable slip ring resistance by employing a Wheatstone bridge whose four arms are mounted entirely upon the rotating member for rotation therewith. Certain or all of these arms contain a variable impedance element such as a strain gage suitbly responsive to the strain of a shaft, propeller blade or other rotating element. As a result of having all four arms of the Wheatstone bridge mounted upon the shaft the variations in slip ring resistance, which is the contact resistance between the slip rings and brushes, do not adversely affect the accurate transmission of any unbalanced bridge voltage through the slip rings. However, such an arrangement involves at least four slip rings and usually requires two and preferably four variable resistance gage elements thereby adding considerably to the cost, complications and maintenance of the equipment, although the broad principles of my present invention disclosed herein can be used advantageously with such a bridge to improve its operation and to this extent the instant application is a continuation-in-part of my copending application Serial No. 430,921, filed February 14, 1942, entitled Torque measuring apparatus, Patent 2,392,293, granted January 1, 1946.

Certain other prior art attempts have used a single variable resistance element of high resistance value mounted upon the rotating member and constituting one member of a responsive circuit such as an arm of a bridge whose remaining arms or members are located somewhere off of the rotating member but connected to the rotating arm through a pair of slip rings. This arrangement has the advantage of a high degree of simplicity in that it requires a single variable resistance device and employs only a single pair of slip rings as compared to the use of four slip rings for a bridge mounted entirely upon the rotating member. These advantages however are more than outweighed by the necessity of using a gage of very high resistance for obtaining reasonable accuracy. If a low resistance gage is used in such a prior art arrangement it is subject to prohibitive errors introduced through the erratically variable resistance of the slip ring and brushes. Hence, even though such apparatus has structurally desirable features nevertheless it has functional features that are seriously undesirable.

The reason a strain gage of the type providing small values of impedance change for a given change in strain gives rise to prohibitive errors is that the variation in slip ring resistance may be large compared to variations in strain gage impedance on a percentage basis. The same holds true in the case of a low resistance type of resistance thermometer used for making accurate temperature measurements on or in a rotating member.

It is an object of my invention to provide an improved and simplified apparatus that is electrically responsive to a condition in connection with a rotatable member and is adapted to transmit a change of impedance in response to such condition through slip rings with a high degree of accuracy, sensitivity and dependability.

A further object is to provide an improved apparatus that allows a single variable impedance means to be used upon a rotating member, in combination with slip rings which connect the single impedance means to an external circuit, in such a manner that all the advantages of the prior art single gage type apparatus as well as of the complete bridge-on-shaft type of apparatus may be obtained without incurring the disadvantages of either.

Another object of my invention is to provide an improved apparatus that is responsive to strain, temperature or other conditions in or on a rotatable member and is adapted to measure a change of impedance responsive to such conditions through slip rings with a high degree of accuracy, sensitivity and dependability, particularly in connection with electrical devices which provide small changes of impedance only.

In accomplishing the above and other objects such as will be apparent to those skilled in the art from the disclosure herein I provide broadly electrical impedance means that is responsive to the desired condition whether it be strain in the rotating member such as torsion, bending, thrust, etc., or temperature or pressure of a fluid, or of a temperature of the rotating member itself, or measurement of speed or acceleration on the rotating member, and this electrical impedance means is connected to a source of power and to a measuring or responsive circuit which is located externally of the rotating member, the connections of the power and responsive circuits to the impedance means being such that changes of voltage arising from changes in impedance are transmitted through slip rings independently of the power connection to said impedance means. My invention is directed primarily to a means for having the desired electrical information conveyed from the specific element to an outside indicating, recording or controlling device. Such devices and instrumentation are well-known and are used in connection with electromagnetic strain gages, accelerometers, resistance thermometers and other well-known commercially available electrical responsive elements which perform any of the condition responsive functions above mentioned.

Other objects and advantages will be more apparent to those skilled in the art from the following description of the acompanying drawings in which:

Fig. 1 is a perspective view of a shaft on which my improved single gage type torque meter is mounted;

Fig. 2 is a cross-sectional view through Fig. 1 to one side of a slip ring to show the relation of the brushes to the slip rings;

Figure 5A:
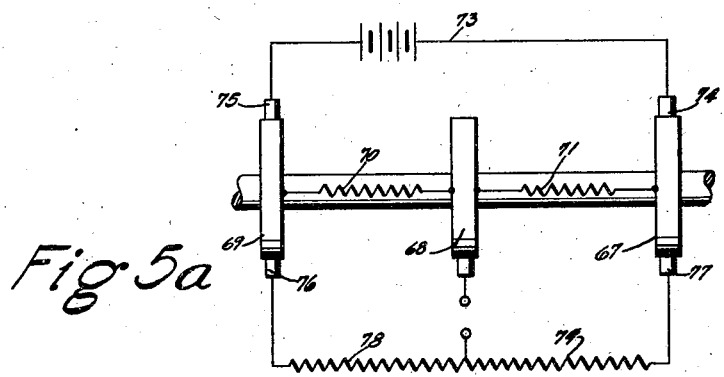
Figure 5B:
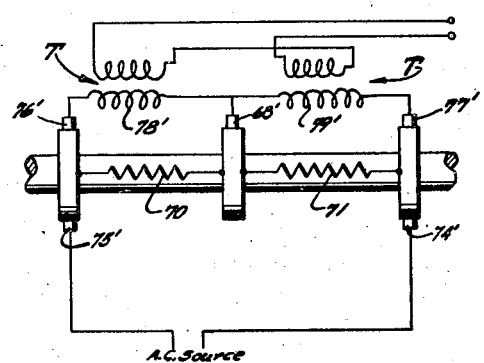
Figure 9:
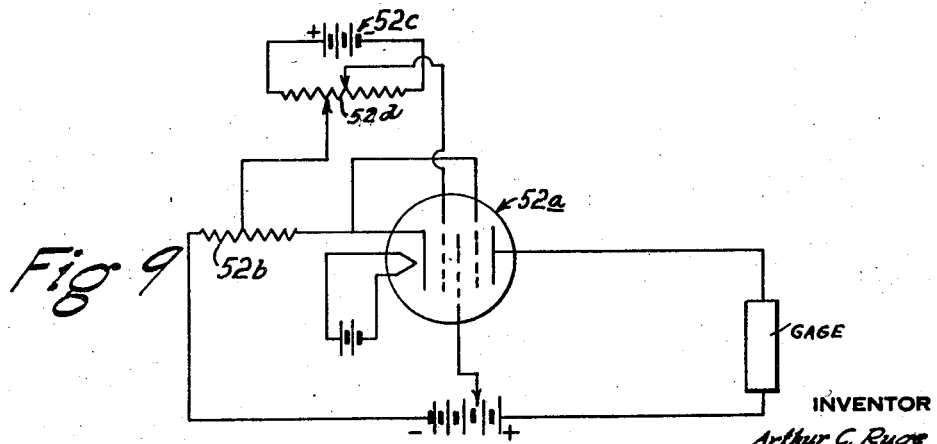
Figure 5C:
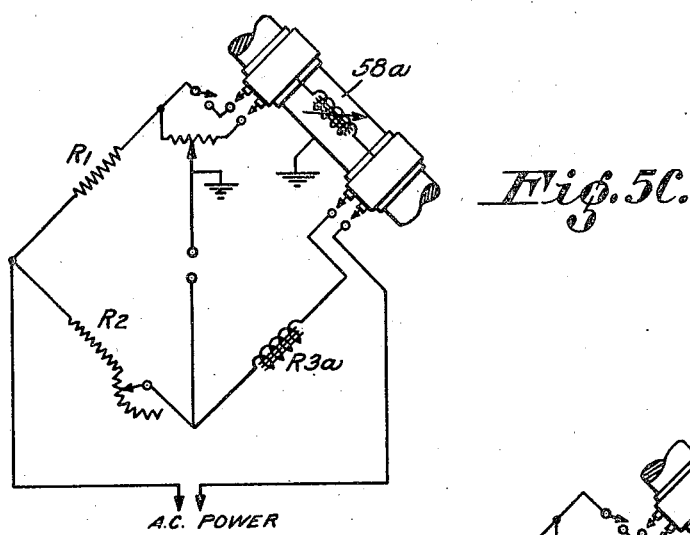
Figure 5D:
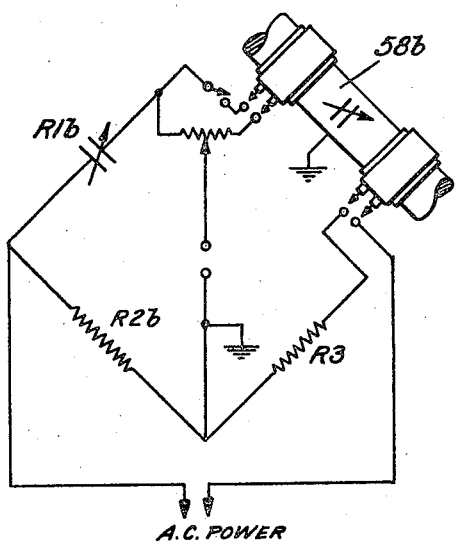
Figure 5E:
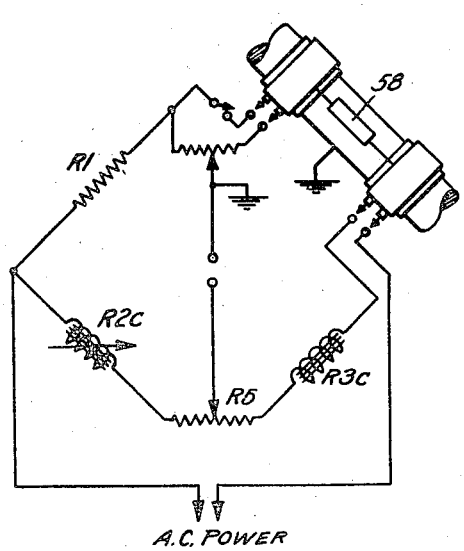

Fig. 3 diagrammatically illustrates one measuring circuit adapted to be used as part of my invention;

Fig. 4 diagrammatically illustrates the application of a single gage type apparatus used in connection with several gages each of which are located at different points on the rotating member to obtain the individual strains at these points;

Fig. 5 is a diagrammatic illustration of a torque meter embodying a further improved circuit;

Figs. 5A and 5B are diagrammatic modifications of Fig. 5;

Figs. 5C, 5D and 5E are further modifications of Fig. 5 showing the use of inductive and capacitative impedance means in my improved circuit;

Fig. 6 is a diagrammatic illustration of my invention employed in connection with a Wheatstone bridge whose four arms are adapted to be mounted entirely upon a rotating member;

Fig. 7 diagrammatically illustrates the use of a pentode tube in place of the ballast resistors of Figs. 3 and 4;

Fig. 8 is a diagram illustrating the peculiar adaptation of the pentode tube characteristics in my improved combination;

Fig. 9 diagrammatically illustrates a grid controlled electronic tube as applied to the circuit of Fig. 7 in place of the vacuum tube thereof; and Figs. 10, 11 and 12 are modifications of the circuit shown in Fig. 5.

Considering one specific application of the invention as disclosed herein for purposes of illustration, I have shown in Fig. 1 a torque meter for a shaft 1 having a strain gage 2 thereon, this strain gage preferably being of a low impedance type such as disclosed in Simmons Patent 2,292,549, wherein an electrical resistance filament of fine wire is bonded throughout its effective length to the surface of a member subject to strain, although it will be understood that other types of electrical strain gages may be used. The gage shown diagrammatically as 2 may be made up of any number of elements suitably disposed and so connected that only two terminals lead to the slip rings. My copending application, Serial No. 430,921, filed February 14, 1942, shows various dispositions and will convey the broad aspects of this preesnt invention to those versed in the art. Other structural and functional aspects of the specific type of bonded wire gage need not be described as they are fully pointed out in said Simmons patent except to mention that the resistance of the gage varies with its strain and that by measuring the change of resistance the strain becomes known. To have such a gage responsive to torsional strain in a shaft the gage is placed thereon preferably at 45 degrees to the shaft axis and the ends of the gage filaments are suitably connected by lead wires 3 and 4 to a pair of slip rings 5 and 6 mounted on the shaft for rotation therewith. Two sets of main brushes 7 and 8 and two sets of auxiliary brushes 9 and 10 are mounted on any suitable stationary member specifically shown as a pair of axially extending bars 11 and 12 secured to a pair of rings 13 and 14, these rings in turn being journalled preferably through ball bearings such as 15 upon the shaft periphery. A suitable arm (not shown) may be used to prevent rotation of the brush frame 11—14. To minimize the adverse effects of brush vibration each set of brushes may consist of a pair of brushes, for example 16 and 17, mounted upon the free ends of a plate spring 18 secured to the brush bars 11 and 12. The other brushes are preferably similarly constructed but for purposes of my invention it will be understood that the respective pairs of brushes, such as 16 and 17, constitute in effect a single brush and that additional sets of brushes may be used in parallel with the type shown in order to assure constant and continuous contact under adverse conditions of dirt, vibration, etc. In the embodiment shown in Fig. 1 a second single gage 20 similar to gage 2 is secured to the shaft while an additional slip ring 21 and sets of main and auxiliary brushes 22 and 23 are provided to connect this single gage into the remaining circuit to be described, although it is to be understood that this second gage is merely to illustrate the simplicity by which any number of gages may be placed in different positions on a rotating member to determine strain variations therein, this simplicity being in contrast to the complications that would ordinarily be needed for the application of a complete bridge mounted entirely on the rotating member at a given point thereof. As shown in Fig. 3, which is a wiring diagram of Fig. 1 illustrating only one gage such as 2, current is supplied to the strain gage 2 from a battery 25 and a high resistance ballast resistor 26 to main brushes 7 and 8, the ballast resistor being for the purpose of maintaining a substantially constant current and having a resistance high compared to the resistance across main brushes 7 and 8. To measure changes of resistance of strain gage 2 the auxiliary brushes 9 and 10 are connected to a potentiometer diagrammatically indicated at 27. The battery 25 and the battery of the potentiometer may be replaced by suitably phased A. C. voltages.

As a result of my improved apparatus employing the main and auxiliary brushes, I am able to use a strain gage or other variable impedance device adapted to have small values of impedance change, specifically shown herein as a resistance change, but without involving the difficulties incident to variable resistance between the brushes and slip rings no matter how erratic such variation may be. This result is accomplished by reason of the auxiliary brushes 9 and 10, which are in the measuring or responsive portion of the circuit, not being subject to the relatively large current flow from battery 25 through the strain gage. Instead the current through the auxiliary brushes 9 and 10 is extremely small by reason of the potentiometer requiring a negligible current and hence variations in slip ring resistance across the auxliary brushes 9 and 10 will not produce a voltage variation of sufficient magnitude compared to the resistance changes of gage 2 as to create any appreciable error. The voltage variations across the main brushes 7 and 8, no matter how large they may be will not influence the voltage drop across the auxiliary brushes 9 and 10 so long as the current through the gage is constant. Thus it is possible to use a strain gage of relatively low resistance such as 100 ohms without any adverse effects arising from variations in slip ring resistance through the auxiliary brushes. This arrangement offers extraordinary improved results compared to those systems requiring high resistance gages or those requiring a complete bridge to be mounted upon the rotating member. Torque meters of my improved type may be made at a relatively low cost with a high degree of accuracy, sensitivity, reliability and simplicity.

*Fig. 4 modification.*—This diagrammatically illustrates the manner in which the second gage 20 or even a third gage 30 may be connected together, one master slip ring 21 being common to all of the gages thereby allowing single slip rings 5, 6 and 31 to be used respectively for the three individual gages. Without this arrangement each single gage would require two slip rings or a total of six rather than the four slip rings shown in Fig. 4, thus further illustrating the high degree of simplicity to which my improved arrangement lends itself. The similarity of this arrangement to the circuit of Fig. 3 is readily appreciated by using the same reference numbers for similar parts. To this end it is noted that main brushes 7 and 8 of Fig. 4 are supplied with current from the battery 25 through the ballast resistor 26 while the auxiliary brushes 9 and 10 are shown as connectible to a suitable amplifier at 32 instead of a potentiometer such as 27, Fig. 3. An amplifier may be used in place of a potentiometer indicating device of the potentiometer 27, Fig. 3, depending upon the particular type of indication or record that may be desired and to this extent any suitable indicating, recording or controlling instrument may be connected at 32. The main brush 22 of Fig. 4 is connected to master slip ring 21 through a ballast resistor 33, battery 34, wires 35 and 36 and thence through brush 8 and slip ring 21 to a wire 37 and gage 20 to complete the circuit back to slip ring 6. Suitable instrumentation such as an amplifier 38 is connected to auxiliary brushes 23 and 10 by way of wires 39, 40 and 41. Similarly, a third gage such as 30 may be connected to a single slip ring 44 and thence through a main brush 45, ballast resistor 46, battery 47 through wires 35 and 36 to the master slip ring 21 from which the circuit is completed through wires 37 and 48 to gage 30. An auxiliary brush 49 is connected to an amplifier 50 or other suitable instrument and through wires 51, 40 and 41 to the auxiliary brush 10 of the master slip ring 21. Thus it is seen that the first gage employs two slip rings and thereafter each gage requires adding only one slip ring which is accomplished by using one of the original slip rings as a common or master ring. Thus I am able to accomplish an extraordinary degree of simplicity where a great many gages are employed such as might be the case where many gages are secured over the surface of an airplane propeller blade or other rotating member. The simplicity is accompanied by maximum accuracy, sensitivity and reliability to the same extent as with only the single gage arrangement of Fig. 3. It will be understood that gages 20 and 30 may be temperature responsive elements if desired.

In place of the ballast resistor, such as 26, Fig. 3, I may employ a type No. 43 pentode tube and utilize certain of its functional characteristics in cooperative relation to my particular slip ring circuits, this tube being given herein the reference number 52, in Fig. 7. Only a portion of the complete slip ring circuit is shown in Fig. 7, it being understood that the remainder of the circuit is identical to Fig. 3 or Fig. 4 depending upon whether only one or a multiplicity of gages are used. In this pentode tube circuit a change of 1 ohm in a 500 ohm gage carrying 30 milliamperes current causes a change of current of .0015 milliampere as compared to a current change .012 milliampere for the same conditions of applied voltage and current through the gage in the fixed resistor circuits. Therefore, the improvement in stability of current in the pentode tube circuit is in the ratio of approximately 8 to 1. In order to achieve the same stability in the fixed resistor circuit as in the pentode tube circuit, the fixed resistor would have to be 19,500 ohm, and a battery voltage of 600 volts would then be required to produce the same current through the circuit. Hence the improved cooperative relationship of my circuit and pentode provide greatly improved means which reduces the effects of extraneous resistance changes in the circuit due to such causes as erratic slip ring contact resistance, and increases the voltage output on the strain gage due to strains applied to it. While I have shown a type 43 pentode tube for purposes of explanation, yet many other types of pentode tubes as well as certain other types of electronic tubes may be used to perform the same function, as is well-known in the art of electronics.

Both of these results are achieved by maintaining the current more nearly independent of certain resistance changes. While the equivalent of stability of current may be achieved in a fixed resistance circuit the example given above shows large voltages and resistances are involved, these having the disadvantages of dangerous voltages to handle, a heavy and bulky battery, and likelihood of undesirable "pick-up" voltage from stray electro-magnetic fields. To appreciate the means by which I utilize a pentode or other suitable electronic tube to overcome the foregoing disadvantages and to obtain the previously mentioned advantages, I have shown in Fig. 8 a diagram in which the solid line 54 represents the sometimes undesirable voltage-current relation of a pentode tube but which I utilize to advantage in my slip ring circuits. The line 54 indicates that current flow through the tube remains relatively constant after reaching a predetermined voltage. The tube, therefore, acts like a resistor which becomes larger and larger the more voltage is applied to it. For purposes of comparison the behavior of a simple fixed resistor is shown by a dashed line 54a. The fixed resistor is chosen so that for a voltage $V_1$ the current $i_1$ through it is the same as that through the pentode tube for the same voltage. If the voltage is now changed to $V_2$ it will be seen that the fixed resistor will pass a far greater change of current than the pentode tube. Other types of pentode tubes that give substantially similar characteristics are types Nos. 58 and 59. As shown in Fig. 9, a grid controlled pentode tube 52a may be used in place of tube 52 and the grid voltage can be controlled by a cathode resistor 52b which may be connected directly to the grid if desired, or if more perfect current control is desired the grid may be biased by any conventional method such as a battery 52c and resistor 52d. As is well known, there are other types of tubes that may be used to obtain the same current regulating function in my particular circuit combination.

From the foregoing disclosure it is seen that by utilizing a pentode tube in place of the ballast resistor of my improved slip ring circuits, I am able to bring certain functional characteristics of the pentode tube into such cooperative relation with any of my circuits and the small change of impedance or resistance in a gage or variable impedance element on a rotating member so as to vastly improve the stability of the circuits with slip rings.

*Fig. 5 modification*—This arrangement maintains the desirable features of a single gage or other device of low impedance change but avoids the use of a high ballast resistor such as 26, etc., of Figs. 3 and 4. Such high ballast resistors are for the purpose of maintaining a constant current through the gage but this, in turn, means a relatively high voltage to obtain sufficient current flow through the gage. While in many instances a high voltage may not be objectionable, yet there are instances where it may mean possible danger and sparking of the brushes if they become defective. In Fig. 5, I eliminate the foregoing disadvantages by employing a low voltage while at the same time maintaining a high degree of accuracy, sensitivity and dependability. To accomplish this I employ a pair of slip rings 55 and 56 mounted on a rotatable shaft or other member 57 which also carries a suitable electrical strain or temperature responsive means 58 such for example as the type of gage previously referred to, the two ends of the gage being connected to the slip rings. A pair of main brushes 59 and 60 is connected to a suitable source of either A. C. or D. C. power generally indicated at 61, the brush 59 being connected to such power through a manually operable switch 62 and one arm of a bridge having by way of example a resistance $R_1$ of say 2000 ohms, although any other convenient size resistance may be employed which if used for temperature compensation may be merely an idle or dummy gage similar to the resistance of gage 58. A pair of auxiliary brushes 63 and 64 respectively engaging the slip rings 55 and 56 is connected to a measuring bridge circuit consisting of a resistance $R_4$, $R_1$, $R_2$ and $R_3$ while an amplifier or other voltage responsive device is connected by wires 65 and 65a between resistance $R_4$ and a bridge balance resistance $R_5$. The wire 65 and rotating member 57 may be suitably grounded while the resistance $R_4$ is adjustable to complete the balance of the bridge. In this arrangement the resistance $R_3$ or other suitable impedance is very large relative to the brush contact resistance 64, the resistance $R_3$ being say of 250,000 ohms. Resistance $R_2$ is chosen so as to balance the bridge while the resistance $R_4$ is a potentiometer whose resistance is high relative to brush resistances 59 and 63, although it may still be small relative to resistance $R_3$. Resistance $R_4$ may be replaced by two fixed resistances $r_1$ and $r_2$ so chosen that the variable brush contact resistances 59 and 63 do not produce any appreciable errors. The adaptation of this type of bridge to main and auxiliary brushes on a pair of slip rings between which an electrically responsive element is connected accomplishes not only the feature in common with the other forms of my invention of reducing the adverse effects of variable resistance across the auxiliary brushes 63 and 64, no matter how erratic it may be, but in addition permits an even higher degree of accuracy to be obtained. This is because the bridge functions, not in a resistance measuring capacity as it has sometimes been used in the past, but as a means for eliminating the effects of variable slip ring resistances. Hence, I am able with this arrangement to condition the circuit so that a subsequent measuring operation can be made to a high degree of accuracy of a relatively small or minute change of resistance in the sensitive element 58 in response to strain or other changes in or on rotating member 57. The primary function of the circuit as a measuring device is to measure changes in the resistance or impedance of one or more active arms constituted of responsive elements. It should be recognized that the total resistance or impedance of the active arm or arms is not generally of interest per se in the methods disclosed herein, although it will be obvious that this can be measured by means of the same circuit.

In the operation of this Fig. 5 modification the resistance across auxiliary brush 63 will change the balance of the bridge only very slightly in relation to the resistance $r_2$ which, together with $r_1$, is shunting the resistance across main brush 59. Also the resistance across auxiliary brush 64 changes the balance of the bridge only in relation to resistance $R_3$ which is very much greater than the resistance across 64. The resistance across main brush 60 does not change the bridge balance at all but merely affects its sensitivity slightly. Now if this bridge is in balance, then the magnitude of the resistance across main brush 59 has no influence on the bridge balance and the resistances such as $R_1$ and $R_4$ are also relatively low so that a comparatively small voltage is required to produce the necessary current flow through gage 58. With the switch 62 closed and $r_1$ and $r_2$ approximately correct the bridge may be balanced by varying any or all of resistances $R_1$, $R_2$ or $R_3$. Switch 62 is then opened and if the bridge is unbalanced the resistances $r_1$ and $r_2$ may be relatively adjusted to rebalance the bridge. These operations are alternately performed until the bridge is in balance with switch 62 either opened or closed. During a measuring operation the switch 62 is, of course, closed in order that the main and auxiliary brushes may function. I have found in practice that good results may be obtained by using fixed values for $r_1$ and $r_2$ and eliminating the switch 62 except under the most exacting conditions.

From the foregoing disclosure of the modifications shown in Figs. 3, 4 and 5, it is seen that Figs. 3 and 4 offer the advantage of simplicity in construction and operation in addition to those advantages of accuracy and dependability all with a single gage of low impedance heretofore pointed out, while Fig. 4 especially allows multiple gages of low impedance to be used with minimum auxiliary circuits while at the same time obtaining all of the advantages of Fig. 3. On the other hand, the modification of Fig. 5 eliminates the disadvantages of Figs. 3 and 4 in that lower voltages can be used with equal sensitivity thereby being more suited for precision measurements than Figs. 3 and 4 in a practical sense, particularly because Fig. 5 is adapted to measure easily to a few parts in a million. As will be evident to those versed in the art, Fig. 5 is illustrative only and many variations may be employed without affecting the scope of my invention. For example, the bridge arms may vary greatly in resistance from those shown and they may be made up of suitable impedance such as resistive, inductive or capacitative, as desired. In Fig. 5C, the condition responsive impedance means is in the form of an inductive element 58A. An inductive element $R3a$ is in another arm of the bridge for opposing element 58A to balance the bridge. In Fig. 5D the condition responsive impedance means consists of a capacity element 58B while a variable capacity $R1b$ is for the purpose of balancing the bridge. In Fig. 5E inductive elements $R2c$ and $R3c$ are shown as external arms of the bridge. Obviously other arrangements within the skill of the art can be used.

*Fig. 5A modification.*—When it is permissible to use three slip rings 67, 68 and 69 the circuit of Fig. 5 may be simplified into that shown in Fig. 5A. In this arrangement two arms 70 and 71 of the bridge rotate with a shaft or other rotating member, and the power circuit 73 with its main brushes 74 and 75 is independent of the Wheatstone bridge circuit which includes auxiliary brushes 76 and 77 and high resistances 78 and 79. The two external arms 78 and 79 are made large relative to the resistance at the auxiliary brushes and hence are negligibly affected by variations in the brush resistance. Suitable instrumentation is connected across brush 68 and a point between resistances 78 and 79. As with any Wheatstone bridge, the battery and galvanometer may be interchanged if desired without impairing the functioning of the device.

This circuit has the advantage that the gage arms 70 and 71 may be differentially variable and yet compensate each other perfectly for temperature effects. As disclosed in my copending application Serial No. 430,921 covering torque measuring apparatus, if strain sensitive gages are used for the gage arms 70 and 71 the circuit may by proper arrangement of the gages be made responsive only to bending or only to torsion or only to thrust, as desired. Arms 70 and 71 may also be devices differentially responsive to temperature or other functions, or they may for example be the two arms of a conventional two-arm electro-magnetic strain gage, etc., without affecting the scope of my invention.

*Fig. 5B modification.*—By way of further illustrating the broad usefulness of the circuit shown in Fig. 5A, I have shown in Fig. 5B a variation in which the two external bridge arms 78' and 79' are primary windings of transformers T, T, the secondaries of which are connected in opposition, so as to provide means for detecting the bridge unbalance. Either A. C. or D. C. current may be fed into the power or main brushes 74' and 75', depending upon the nature of the measuring, detecting, or controlling problem. Since the secondaries of the transformers can be made to draw a negligible current (as compared with the current flowing through the main brushes), it will be seen that the auxiliary brushes 68', 76' and 77' will not adversely affect the accuracy of the device.

*Fig. 6 modification.*—This modification is the same as that shown in Fig. 17 of my copending application Serial No. 430,921, filed February 14, 1942. A D. C. or A. C. voltage is supplied to both the bridge and the balancer 243' from a common source. The voltage for the balancing circuit is obtained through a set of auxiliary brushes 243d which contact the same slip rings 243e through which battery voltage is impressed upon the bridge by a separate set of brushes 243f. By adjusting the contacts 243a the bridge unbalance may be determined. In this arrangement the bridge balancing method does not depend upon the battery holding its voltage constant. In this respect it is broadly like an A. C. circuit with separate transformer windings supplying voltages to the bridge and balancer and which is therefore independent of voltage variations on the line 242. In operation, a current of considerable magnitude flows through brushes 243f to feed the bridge; this current might be 60 or more milliamperes. Now if there is a resistance at brushes 243f of, say 1 ohm, there would be a very considerable voltage drop across the brush to the slip ring connection, and if the two brushes 243f have different or varying resistances these voltage drops are large enough to cause serious errors in the reading unless my auxiliary brushes 243d are used to feed the balancing circuit. As an example, even in a well built system one might find errors of as much as 10 percent due to this effect when only a single brush is used in place of brushes 243d and 243f. If the bridge 240 were not mounted entirely upon the shaft so as to form a closed loop rotating therewith, then the slip ring resistance would cause a still greater error, in fact, the error might be of the order of 100 or 1000 times as much. Thus it is seen that placing the bridge entirely upon the shaft accomplishes the result of minimizing the effect of slip ring resistance. To further minimize any possible error arising in the type of measuring circuit just mentioned, I employ auxiliary brushes 243d for the balancing circuit and these brushes "see" the voltage actually on the slip ring rather than the voltage on the wiring leading to brushes 243f. Thus, because the resistance of the balancing circuit is relatively great and practically no current flows through auxiliary brushes 243d, no appreciable voltage drop occurs across them.

*Figs. 10, 11 and 12.*—The circuits disclosed in Figs. 10, 11 and 12 are improvements over the disclosure of Fig. 5 in that they obviate the necessity of employing the high resistance arm R₃ and in that any or all arms of the bridge may be brought out through slip rings. Corresponding parts of the various figures are given the same reference number even though certain of these parts are found in Figs. 10, 11 and 12 in somewhat different arrangement from that of Fig. 5.

In Fig. 10 I show how one or more arms of the bridge can be brought out through slip rings. It should be observed that arms R₁ and R₃ could likewise be carried through slip rings so long as the main and auxiliary brushes are used in the manner shown for bringing out the elements 58. Four points are brought out and labelled "corners of the bridge." Any desired opposite corners may be used as the power terminals. The remaining corners would then be used for the unbalance detector or control or recording device. Means for balancing the bridge are omitted as this is shown in Fig. 5 and is of conventional form not requiring illustration in every figure. The device of Fig. 10 may be used to obtain the difference between the torques of the two shafts or it could be used in an arrangement where first one shaft works and then the other, for example. Differential torque measurements are of great value in adjusting or controlling the tension on fabrics or rubber passing through rolls in industrial processes.

The essential feature of Figs. 10 and 11 is the use of the voltage divider and auxiliary brush circuit at each corner having a slip ring. This permits the use of low impedance arms throughout if desired, as compared with high impedance arms R₂ and R₃ of Fig. 5 and is of value because the low impedance arms minimize the possibility of picked-up disturbances when used with electronic devices. It also makes it practical to use low-resistance galvanometers as bridge balance indicators.

Fig. 11 is the counterpart of Fig. 5A. Parts are marked corresponding to Fig. 5. This circuit is useful where temperature compensation is essential in torque measurement, where bending or thrust is to be measured, or where differential temperature measurements are to be made. Whereas Fig. 5A requires high resistance arms 78 and 79, Fig. 11 will give equally good results employing low resistance arms.

Fig. 12 combines parts of Fig. 6 with parts of Fig. 10 and forms a circuit of considerable value. It should be recognized that any or all arms of the bridge may be brought out through slip rings after the teaching of Fig. 10, so long as the balancing circuit (243a and 243') connects to auxiliary brush 59. Thus, in Fig. 10 or 11 the balancing circuit can go across the two brushes 59. This combination substantially eliminates errors both from slip ring resistance and power source variation.

It is of course to be understood that wherever auxiliary and main brushes are used on a common slip ring, this ring may be circumferentially split with the auxiliary brush on one half and the main brush on the other half, but the two halves electrically connected so that functionally they are the equivalent of a single ring.

From the disclosure of the several modifications, it is seen that I have provided a relatively simple apparatus that is electrically responsive to strain or other functions or conditions in a rotatable member and is adapted to measure the electrically responsive change of voltage through slip rings with a high degree of accuracy, sensitivity and dependability. In fact, my arrangement is so effective that it is fundamentally adapted to allow, for example, a single low impedance strain gage to be mounted upon the rotating member and the change of resistance to be accurately measured through only one pair of slip rings.

It will of course be understood that various changes in details of construction and arrangement of parts may be made by those skilled in the art without departing from the spirit of the invention as set forth in the appended claims.

I claim:

1. Apparatus responsive to a change of condition to be transmitted from a rotatable member comprising, in combination, electrical impedance means mounted on said member to rotate therewith and adapted to undergo a change of impedance in response to a change of said condition, a pair of slip rings mounted on said rotatable member and connected to said electrical impedance means, a power circuit having main brushes engaging said slip rings for supplying current to said electrical impedance means, auxiliary brushes engaging said slip rings, and a second circuit connected to said auxiliary brushes and being responsive to changes of impedance of the electrical impedance means substantially independently of the resistance between said main brushes and said slip rings.

2. The combination set forth in claim 1 further characterized in that said power circuit is located externally of said rotating member and has a ballast resistor of normally constant and sufficiently high resistance whereby variable changes in resistance across said main brushes are relatively small compared to said resistor thereby to maintain a substantially uniform current flow through said power circuit.

3. The combination set forth in claim 1 further characterized in that said electrical impedance means comprises a Wheatstone bridge with all four arms mounted on said member for rotation therewith, said pair of slip rings with their main and auxiliary brushes being connected to two corners of the bridge, and another pair of rings having contacting brushes, said latter pair of rings being connected to the other corners of the bridge, whereby the bridge unbalance may be brought out to an external measuring or control circuit.

4. Apparatus responsive to a change of condition to be transmitted from a rotatable member comprising, in combination, electrical impedance means mounted on said member for rotation therewith and adapted to undergo a change of impedance in response to a change of said condition, a single pair of slip rings mounted on said member and connected to said electrical impedance means, main and auxiliary brushes engaging said slip rings, a source of power connected to said electrical impedance means through said main brushes, and a circuit responsive to changes of impedance of said impedance means and being connected thereto through said auxiliary brushes and through at least certain of said main brushes, so as to be responsive solely to said changes of impedance substantially independently of contact resistance between the brushes and slip rings.

5. Apparatus responsive to a change of strain and in which the strain response is to be transmitted electrically from a rotatable member comprising, in combination, a single electrical strain responsive element mounted on said member for rotation therewith, a single pair of slip rings mounted on said rotatable member and connected to said responsive element, a power circuit having main brushes for supplying current to said electrical strain responsive element through said slip rings, and a second circuit having auxiliary brushes engaging said slip rings whereby said latter circuit is adapted to be responsive to changes of strain of said element substantially independently of the resistance between said main brushes and said slip rings.

6. Apparatus responsive to a change of temperature and in which the temperature response is to be transmitted electrically from a rotatable member comprising, in combination, a single electrical temperature responsive element mounted on said member for rotation therewith, a pair of slip rings mounted on said rotating member and connected to said responsive element, a power circuit having main brushes for supplying current to said electrical temperature responsive element through said slip rings, and a second circuit having auxiliary brushes engaging said slip rings so that said second circuit is substantially responsive to the difference in potential between said pair of rings substantially independently of the resistance between said main brushes and said slip rings.

7. Apparatus responsive to a change of condition and in which the condition response is to be transmitted electrically from a rotatable member comprising, in combination, electrical impedance means responsive to said change of condition mounted on said member for rotating therewith, a pair of slip rings mounted on said rotatable member and connected to said impedance means, a power circuit having main brushes for supplying current to said impedance element through said slip rings, a bridge circuit of which said impedance means constitutes one arm while the other three arms of the bridge are located externally of said rotating member, and auxiliary brushes engaging said slip rings for connecting said impedance means to said external arms.

8. The combination set forth in claim 6 further characterized in that said second circuit comprises a bridge of which said single electrical element constitutes one arm, the connection between said element and the rest of the bridge circuit being made through said auxiliary brushes and through at least certain of said main brushes.

9. Apparatus responsive to a change of condition and in which the condition response is to be transmitted electrically from a rotatable member, in combination, electrical means mounted on said member for rotation therewith and adapted to undergo a change of impedance in response to a change in said condition, a pair of slip rings mounted on said rotating member, a power circuit having main brushes engaging said slip rings for supplying current to said electrical means, said power circuit having a grid controlled vacuum tube adjusted so as to maintain a substantially constant current in said power circuit substantially independently of voltage variations therein, and a second circuit having auxiliary brushes engaging said slip rings so that said second circuit is substantially responsive to the difference in potential between said pair of rings substantially independently of resistance variations between said slip rings and the main and auxiliary brushes.

10. The combination set forth in claim 9 further characterized in that said vacuum tube is of the pentode tube type.

11. Electrical apparatus responsive to a change of condition on a rotating member comprising, in combination, electrically responsive means mounted on said member for rotation therewith, a pair of slip rings mounted on said rotating member and connected to said electrically responsive means, a power circuit comprising a source of electrical power external to said rotating member, an impedance element external to said rotating member, main and auxiliary brushes on each of said slip rings, said electrically responsive means being connected with said source of power and said external impedance element in series with each other, said series connection being through said main brushes and slip rings, a second circuit comprising two additional external impedance elements in series connected directly to the power side of the impedance element of the power circuit and to the power side of said electrical responsive means through one of said auxiliary brushes, said second circuit continuing through said impedance element and thence through one of the main brushes and through the electrical responsive means of said power circuit, the second and power circuits together forming a bridge, the second one of said auxiliary brushes acting on the slip ring which is common to the power circuit impedance element and electrical responsive means, a voltage divider connected in shunt across said main and auxiliary brushes on said common slip ring, and controlled means connected across the dividing point of said voltage divider and the common point between said two additional series connected impedance elements of said second external circuit so as to be responsive to changes in said electrically responsive means, the additional external impedance element which is connected directly to the power side of the responsive element being sufficiently large compared to variations of brush contact resistance so that the response of said controlled means is substantially independent of resistance variations between said slip rings and the main and auxiliary brushes.

ARTHUR C. RUGE.

REFERENCES CITED

The following references are of record in the file of this patent:

UNITED STATES PATENTS

| Number | Name | Date |
| --- | --- | --- |
| 2,073,394 | MacMillan | Mar. 9, 1937 |
| 925,180 | Harris | June 15, 1909 |
| 2,082,317 | Barber | June 1, 1937 |
| 880,074 | Haagn | Feb. 25, 1908 |
| 2,166,935 | Adams | July 25, 1939 |
| 2,252,464 | Kearns et al. | Aug. 12, 1941 |
| 1,665,822 | Shimizu | Apr. 10, 1928 |
| 2,316,975 | Ruge | Apr. 20, 1943 |
| 594,533 | Henius | Nov. 30, 1897 |
| 2,313,682 | Stuart | Mar. 9, 1943 |
| 1,212,751 | Everett | Jan. 16, 1917 |
| 2,362,589 | Simmons | Nov. 14, 1944 |
| 2,129,036 | Schlesinger | Sept. 6, 1938 |

FOREIGN PATENTS

| Number | Country | Date |
| --- | --- | --- |
| 541,942 | Great Britain | Dec. 18, 1941 |
| 423,706 | Great Britain | Feb. 6, 1935 |
| 470,454 | Germany | Jan. 15, 1929 |